(12) United States Patent
Lu et al.

(10) Patent No.: US 8,206,845 B2
(45) Date of Patent: Jun. 26, 2012

(54) BATTERY COVER ASSEMBLY FOR PORTABLE ELECTRONIC DEVICE

(75) Inventors: Jun Lu, Shenzhen (CN); Bin Zhao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 500 days.

(21) Appl. No.: 12/391,353

(22) Filed: Feb. 24, 2009

(65) Prior Publication Data
US 2010/0136395 A1    Jun. 3, 2010

(30) Foreign Application Priority Data
Nov. 28, 2008   (CN) .......................... 2008 1 0305862

(51) Int. Cl.
*H01M 5/10* (2006.01)
(52) U.S. Cl. .......................................... 429/97; 429/100
(58) Field of Classification Search ...................... 429/97
See application file for complete search history.

(56) References Cited

U.S. PATENT DOCUMENTS
2006/0288584 A1* 12/2006 Chu ................................ 30/153
2007/0026297 A1* 2/2007 Qin et al. ......................... 429/97

FOREIGN PATENT DOCUMENTS
CN           2770102 Y        4/2006
* cited by examiner

*Primary Examiner* — Ula C. Ruddock
*Assistant Examiner* — Jacob Marks
(74) *Attorney, Agent, or Firm* — Altis Law Group, Inc.

(57) ABSTRACT

A battery cover assembly for a portable electronic device, the battery cover assembly includes a housing, a removable battery cover and a locking mechanism. The housing defines an opening and a receiving hole communicating each other. The removable battery cover includes a protrusion. The locking mechanism includes a latching member and an operating member. The latching member engages in the opening of the housing, the latching member forming a post engaging with the protrusion of the cover. The operating member engages in the receiving hole of the housing, and the operating member rotatably brings the latching member to releasably lock the post with the protrusion of the cover.

5 Claims, 4 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
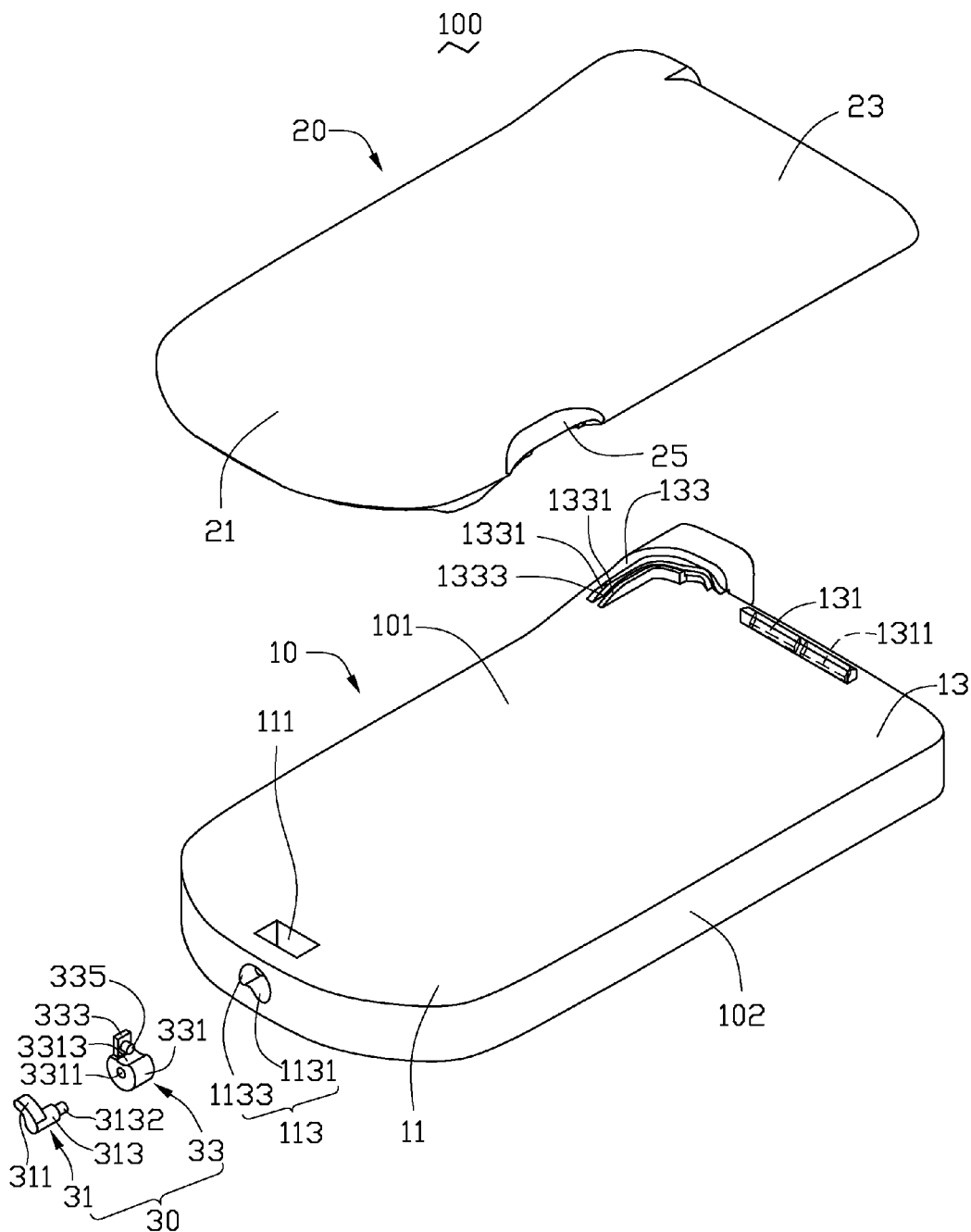
FIG. 1 is an exploded, isometric view of a portable electronic device employing a battery cover assembly in accordance with an exemplary embodiment.

FIG. 1 shows a portable electronic device 100, such as a mobile phone, employing a battery cover assembly. The mobile phone 100 is an exemplary application, for the purposes of describing details of a battery cover assembly of an exemplary embodiment. The battery cover assembly incorporates a housing 10, a removable battery cover 20, and a locking mechanism 30. The locking mechanism 30 releasably latches (i.e. attaches, locks, engages) the removable battery cover 20 to the housing 10.

Referring to FIG. 1, the housing 10 includes a top surface 101 and a peripheral wall 102 surrounding the top surface 101. The housing 10 includes a first end 11, and a second end 13. The top surface 101 defines an opening 111 adjacent to the first end 11. The peripheral wall 102, adjacent to the first end 11, defines a receiving hole 113. The receiving hole 113 perpendicularly communicates with the opening 111. The receiving hole 113 is surrounded by an arcuate portion 1131 and a bent portion 1133. The housing 10 forms a latching portion 131 at the top surface 101 adjacent to the second end 12. The latching portion 131 defines two spaced grooves 1311 at one side thereof toward the second end 12. The housing 10 forms a mounting portion 133 at one side of the latching portion 131. The mounting portion 133 includes two spaced ribs 1331 and a slot 1333 therebetween.

Figure 2:
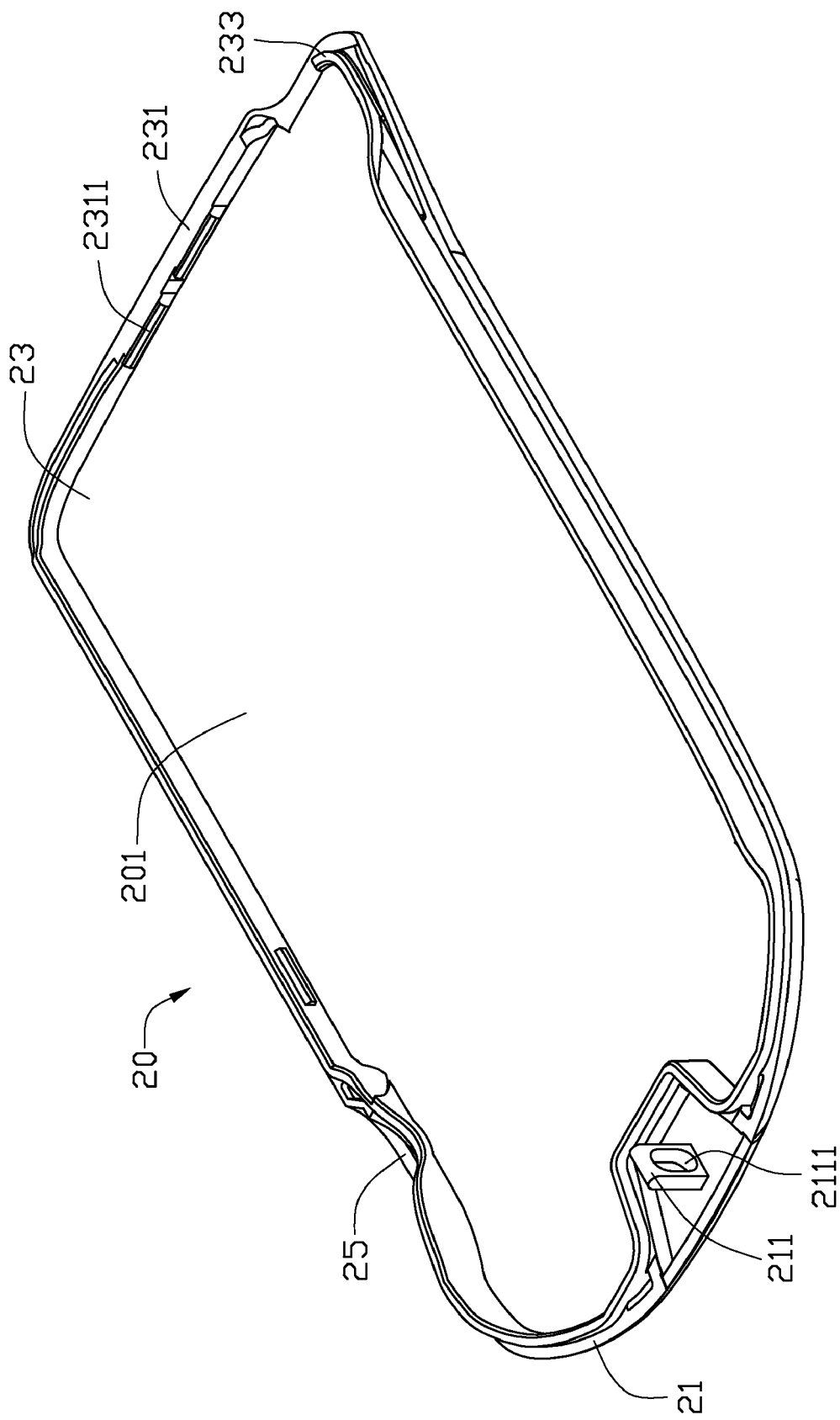
FIG. 2 is an enlarged view of the cover shown in FIG. 1 from another aspect.

Referring to FIG. 2, the removable battery cover 20 includes an inner surface 201, a bottom end 21 and a top end 23 opposite to the bottom end 21. The bottom end 21 forms a protrusion 211 at the inner surface 201. Protrusion 211 defines a through hole 2111. The top end 23 extends to form a top wall 231. The top wall 231 forms two projections 2311 for being received in a corresponding groove 1311 of the housing 10. An extending wall 233 extends from the top wall 231 for being received in the slot 1333 of the mounting portion 133. The battery cover 20 forms a recess 25 at one side thereof for operating the battery cover 20.

The locking mechanism 30 includes an operating member 31, and a latching member 33.

The operating member 31 is received in the receiving hole 113, and includes an operating portion 311 and an extending portion 313. The configuration of the operating portion 311 is similar to that of the receiving hole 113, but the size of the operating portion 311 is smaller than that of the receiving hole 113. The extending portion 313 is substantially a stepped-cylinder, and perpendicularly extends from the operating portion 311. The extending portion 313 has a threaded end 3132.

The latching member 33 is received in the opening 111, and includes a cam portion 331, a support board 333 and a post 335. The cam portion 331 defines an axial hole 3311 for threadly connected with the threaded end 3132. The cam portion 331 defines a depressed part 3313 at one side thereof. The support board 333 is perpendicularly positioned on the cam portion 331 at one side of the depressed part 3313. The post 335 perpendicularly extends from the support board 333.

Figure 3:
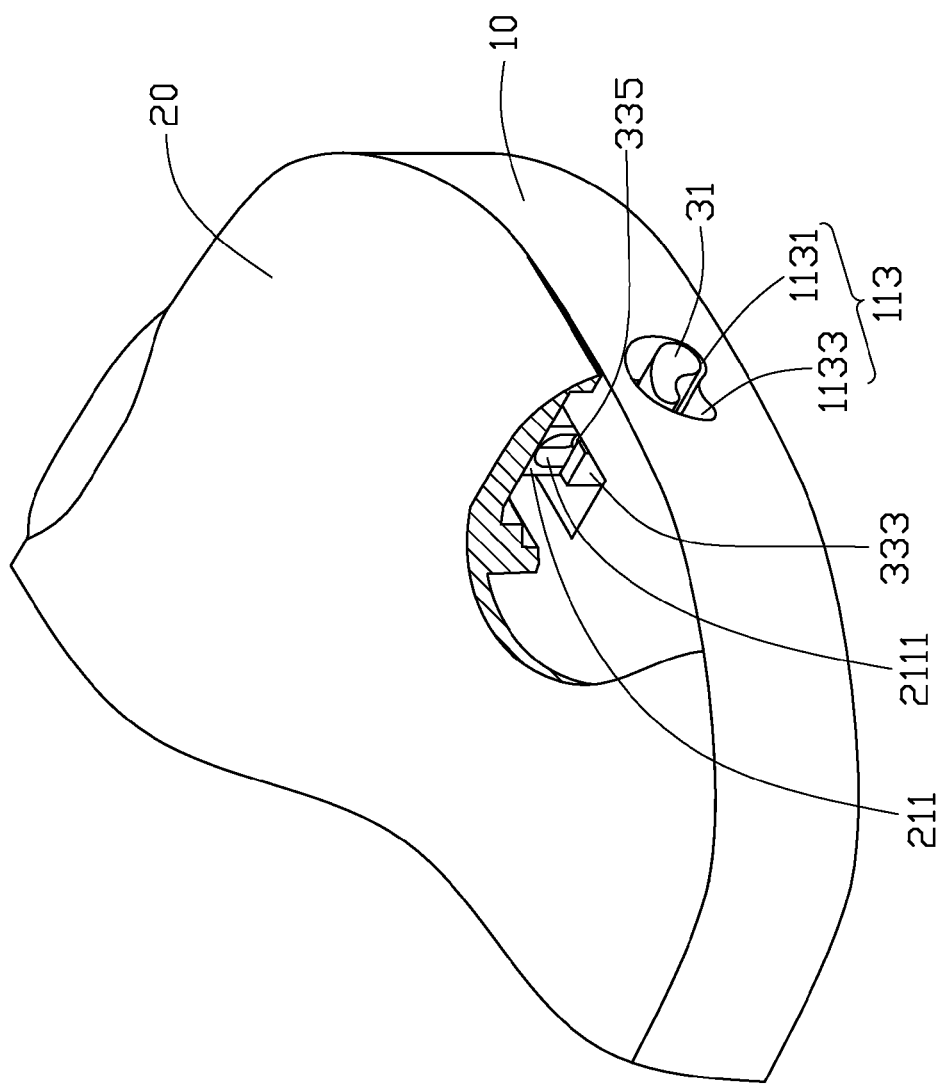
FIG. 3 is a partially, cut-away view of the battery cover assembly showing a locked state.

During assembly of the battery cover assembly, referring to FIG. 3, the latching member 33 is received in the opening 111. The threaded end 3132 of the extending portion 313 passes through the receiving hole 113, and is inserted into the axial hole 3311 for threadedly connecting to the latching member 33. The battery cover 20 is positioned above the housing 10. The protrusion 211 resists the depressed part 3313 of the cam portion 331, the post 335 is locked in the through hole 2111 of the protrusion 211. The extending wall 233 is received in the slot 1333 of the mounting portion of the housing 10. The projections 2311 respectively engage in the grooves 1311 of the latching portion 131. Thus, the battery cover 20 is assembled in the housing 10. At a locked state of the cover 20, the operating member 31 is spaced from the bent portion 1133 of the receiving hole 113.

Figure 4:
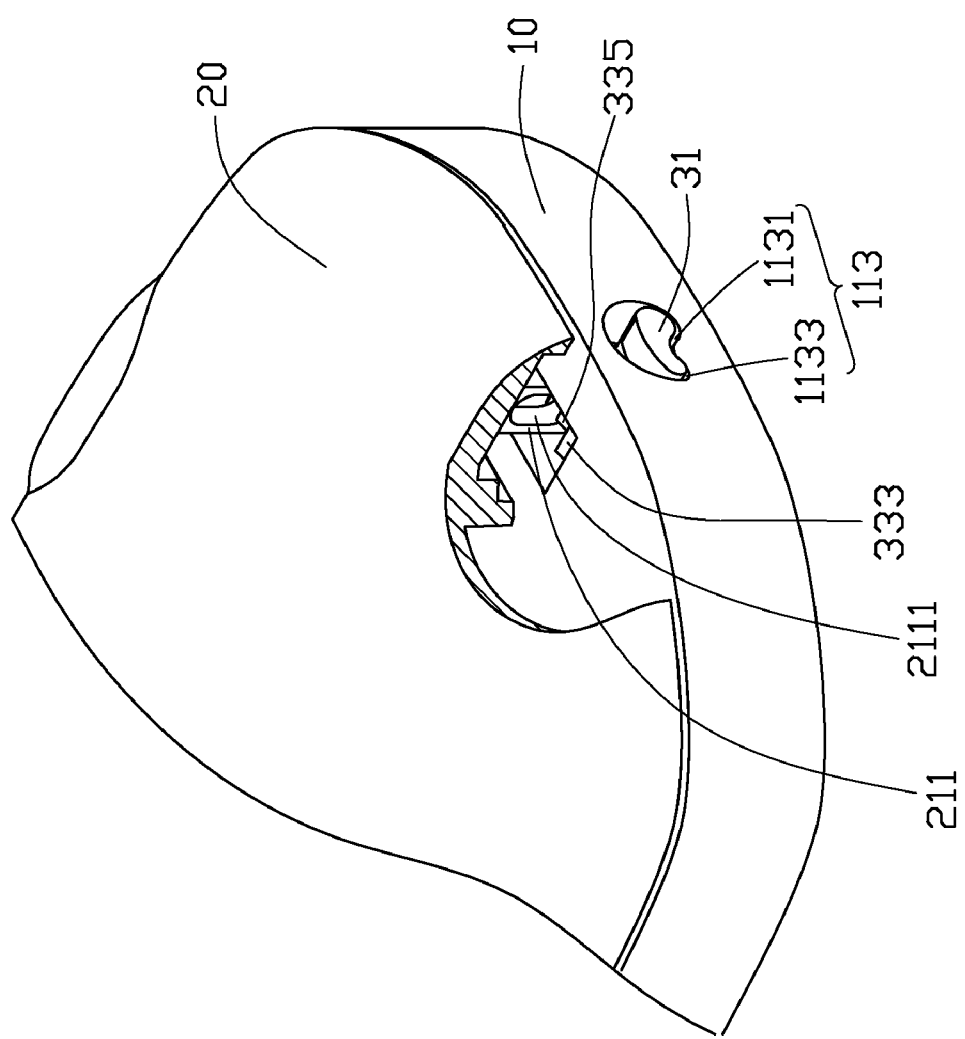
FIG. 4 is a partially, cut-away view of the battery cover assembly showing an open state.

Referring to FIG. 4, to open the cover 20, the operating member 31 is rotated toward the bent portion 1133 so as to make the operating portion 311 resists the bent portion 1133 of housing 10. During the rotating process of the operating portion 311, the latching member is forced to rotate so as to allow the post 335 to exit from through hole 2111. The depressed part pushes the protrusion 211 upward to detach the cover 20 from the housing 10.

As described above, the exemplary embodiment provides a battery cover assembly for portable electronic devices, such as mobile phones. When the operating member is rotated, the cover of the battery cover assembly can be easily opened. This rotatable removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable electronic device comprising:
    a housing including a top surface and a peripheral wall surrounding the top surface, the top surface defining an opening and the peripheral wall defining a receiving hole communicating with the opening;
    a removable battery cover including a protrusion defining a through hole, the cover covering the top surface and the opening;
    a locking mechanism engaging in the receiving hole and the opening of the housing, the locking mechanism including a latching member and an operating member fixed together, the latching member including a post for engaging with the through hole of the cover, the latching member and the operating member rotatably locking the cover to the housing.

2. The portable electronic device as claimed in claim 1, wherein the operating member includes an operating portion and an extending portion perpendicularly extending therefrom, the extending portion is a stepped-cylinder, and includes a threaded end.

3. The portable electronic device as claimed in claim 2, wherein the latching member includes an axial hole for threadly connected with the threaded end.

4. the portable electronic device as claimed in claim 1, wherein the latching member includes a cam portion, a support board and a post, the support board is perpendicularly positioned on the cam portion, and the post perpendicularly extends from the support board, and is above the cam portion.

5. The portable electronic device as claimed in claim 1, wherein the receiving hole is surrounded by an arcuate portion and a bent portion, the operating member resisting the bent portion to separate the post from the protrusion.

* * * * *